(12) United States Patent
Iwata et al.

(10) Patent No.: US 7,580,352 B2
(45) Date of Patent: Aug. 25, 2009

(54) HUB APPARATUS

(75) Inventors: Kouichi Iwata, Fukuoka (JP); Shinya Yonemoto, Fukuoka (JP); Kazuaki Yoshida, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 422 days.

(21) Appl. No.: 11/657,044

(22) Filed: Jan. 24, 2007

(65) Prior Publication Data

US 2007/0177504 A1 Aug. 2, 2007

(30) Foreign Application Priority Data

Jan. 31, 2006 (JP) ............................. 2006-023551

(51) Int. Cl.
*H04J 1/16* (2006.01)
(52) U.S. Cl. ................... 370/230; 370/235.1
(58) Field of Classification Search ................ 370/230, 370/235, 235.1
See application file for complete search history.

(56) References Cited

U.S. PATENT DOCUMENTS

| 7,313,144 | B2* | 12/2007 | Kobayashi et al. ..... 370/395.43 |
| 7,339,890 | B2* | 3/2008 | Burns ....................... 370/230.1 |
| 7,430,173 | B2* | 9/2008 | St. Denis et al. ......... 370/235.1 |
| 2005/0135378 | A1* | 6/2005 | Rabie et al. ............ 370/395.21 |
| 2005/0163049 | A1* | 7/2005 | Yazaki et al. ............... 370/230 |
| 2006/0215558 | A1* | 9/2006 | Chow ......................... 370/232 |
| 2007/0076621 | A1* | 4/2007 | Malhotra et al. ............ 370/252 |
| 2007/0206501 | A1* | 9/2007 | Alesi et al. .................. 370/235 |
| 2007/0223375 | A1* | 9/2007 | Ohta et al. .................. 370/230 |
| 2007/0248005 | A1* | 10/2007 | Pan et al. .................... 370/230 |
| 2008/0031132 | A1* | 2/2008 | Compton et al. ............ 370/230 |
| 2008/0219160 | A1* | 9/2008 | Trinh et al. ................. 370/230 |
| 2008/0298234 | A1* | 12/2008 | Ishikawa et al. ............ 370/230 |

FOREIGN PATENT DOCUMENTS

| JP | 4-178044 | 6/1992 |
| JP | 5-227193 | 9/1993 |
| JP | 6-46085 | 2/1994 |

* cited by examiner

*Primary Examiner*—Andrew Lee
(74) *Attorney, Agent, or Firm*—Staas & Halsey LLP

(57) ABSTRACT

A hub apparatus is disclosed that includes plural input ports; a policer unit that monitors the input bandwidth of the input ports and controls acquisition and discarding of input packet data input via the input ports, the policer unit including plural policers assigned to the input ports that have input token buckets for accumulating input tokens; a packet multiplexer that multiplexes the input packet data acquired by the policer unit; a shaper that transmits the multiplexed packet data at equal intervals according to an output bandwidth, the shaper including an output token bucket that accumulates output tokens up to a predetermined amount; and a surplus token recycling unit that recycles surplus tokens exceeding the predetermined amount that are generated at the output token bucket of the shaper by distributing the surplus tokens to the input token buckets of the policers of the policer unit.

4 Claims, 8 Drawing Sheets

HUB APPARATUS

BACKGROUND OF THE INVENTION

1. Field of the Invention

The present invention relates to a hub apparatus that multiplexes packets input via plural input ports and transmits the multiplexed packets to a network.

2. Description of the Related Art

A hub apparatus that concentrates packet data transmitted from plural users is generally arranged at the input/output of a network such as a carrier network.

FIG. 1 is a diagram showing an exemplary configuration of a conventional hub apparatus. The illustrated hub apparatus includes a policer unit 11, a packet multiplexer 12, a shared memory 13, and a shaper 14. The policer unit 11 is configured to monitor the input bandwidth and includes policers 11P1-11Pn having input token buckets that are assigned to input ports $10_1$-$10_n$, respectively. When packet data are input at intervals exceeding the MBS (Maximum Burst Size) for the input token buckets, that is, when burst packet data are input, some packet data are discarded to control the traffic of input packet data.

The packet multiplexer 12 multiplexes packet data acquired (i.e., not discarded) by the policer unit 11 according to header information and stores the multiplexed packet data in the shared memory 13. The shaper 14 includes an output token bucket that accumulates tokens, reads transmission packet data from the shared memory 13 when tokens for transmitting the transmission packet data are accumulated in the output token bucket, and transmits the packet data to a network via a single output port 15 at equal packet transmission intervals in order to reduce data bursts at the hub apparatus.

It is noted that tokens indicate the ability of the policer unit 11 and the shaper 14 to transmit packet data. According to the token bucket scheme employed by the policer unit 11 and the shaper 14 in the present example, tokens are accumulated in a token bucket at a fixed rate, and when a predetermined amount of tokens are accumulated, received packet data are transmitted and a corresponding amount of tokens are consumed from the token bucket. When the tokens accumulated in the token bucket exceed the MBS for the token bucket, surplus tokens exceeding the MBS are discarded.

Japanese Laid-Open Patent Publication No. 4-178044 discloses a traffic control scheme for accurately determining whether service quality of call parameters requested by the user may be ensured upon accepting a call and maintaining the service quality at a maximum during switching operations of the accepted call.

Japanese Laid-Open Patent Publication No. 5-227193 discloses a technique for improving throughput of an output circuit while individually satisfying requested communication qualities for information signals of various service classes by taking into consideration the differences in traffic characteristics of the information signals of different service classes, statistical multiplexing effects, and fluctuations in burst characteristics, for example.

Japanese Laid-Open Patent Publication No. 6-46085 discloses a technique for generating traffic parameters of every call channel based on the transmission cell count number of every time interval and controlling a policing circuit based on the generated traffic parameters.

The illustrated hub apparatus of FIG. 1 performs packet data traffic monitoring by having the policer unit 11 and the shaper 14 perform token monitoring independently. In this case, when burst packet data are momentarily input, packet data may be discarded at the policer unit 11 side even when there are sufficient resources (output tokens) at the shaper 14 side, for example.

It is noted that in variable length packet data communication, one port of a hub apparatus is shared by plural users, and therefore, when plural users simultaneously establish communication for different services, packet data may be concentrated, communication packet intervals may be shortened, and the input bandwidth may be occupied so that the bandwidth of input packet data may momentarily increase. Such packet data are referred to as burst packet data.

FIG. 2 is a diagram illustrating the increase/decrease of policer tokens at a given port and the acquisition of input packet data. The policer unit 11 may enable acquisition of input packet data when sufficient tokens for acquiring the packet data are accumulated. By acquiring the packet data, a corresponding amount of tokens are consumed.

As is shown in FIG. 2, the intervals between input packet data P1 through P3 are relatively long so that sufficient time may be secured for accumulating tokens necessary for acquiring the packet data P1 through P3. Thus, the packet data P1 through P3 may be accurately acquired.

On the other hand, intervals between input packet data P4 through P6 are rather short (burst packet data) so that sufficient time may not be secured for accumulating tokens for acquiring the packet data P4 through P6, and tokens may be consumed without being sufficiently replenished. Thus, tokens may be depleted and packet data P6 may have to be discarded as a result.

SUMMARY OF THE INVENTION

According to an aspect of the present invention, a hub apparatus is provided for reducing cases of discarding packet data due to momentary occurrence of burst packet data input.

According to one embodiment of the present invention, a hub apparatus is provided that includes plural input ports;

a policer unit that monitors an input bandwidth of the input ports and controls acquisition and discarding of input packet data input via the input ports, the policer unit including plural policers assigned to the input ports which policers include input token buckets for accumulating input tokens;

a packet multiplexer that multiplexes the input packet data acquired by the policer unit;

a shaper that transmits the multiplexed packet data at equal intervals according to an output bandwidth, the shaper including an output token bucket that accumulates output tokens up to a predetermined amount; and a surplus token recycling unit that recycles surplus tokens exceeding the predetermined amount that are generated at the output token bucket of the shaper by distributing the surplus tokens to the input token buckets of the policers of the policer unit.

In one preferred embodiment of the present invention, the surplus token recycling unit may include a surplus token gathering unit that gathers the surplus tokens exceeding the predetermined amount generated at the output token bucket of the shaper; and a token distributing unit that distributes the surplus tokens to the input token buckets of the policers assigned to the input ports according to a ratio of bandwidths assigned to the input ports.

In another preferred embodiment of the present invention, at least one of the policers assigned to the input ports may include a classifier that classifies the input packet data into at least one of plural different classes; and plural class token buckets that accumulate corresponding class tokens of class tokens assigned to the different classes; wherein the surplus tokens distributed to the policer by the token distributing unit are further distributed to the class token buckets according to a predetermined class distribution ratio.

In another preferred embodiment of the present invention, the input packet data may have a tag including a user priority value; and the classifier may classify the input packet data according to the user priority value included in the input data packet.

According to an aspect of the present embodiment, by distributing surplus tokens generated at the output token bucket of the shaper to the input token buckets of the policers assigned to the input ports, the discarding of packet data due to momentary occurrence of burst packet data input may be reduced, for example.

DESCRIPTION OF THE PREFERRED EMBODIMENTS

In the following, preferred embodiments of the present invention are described with reference to the accompanying drawings.

Embodiment

Figure 1:
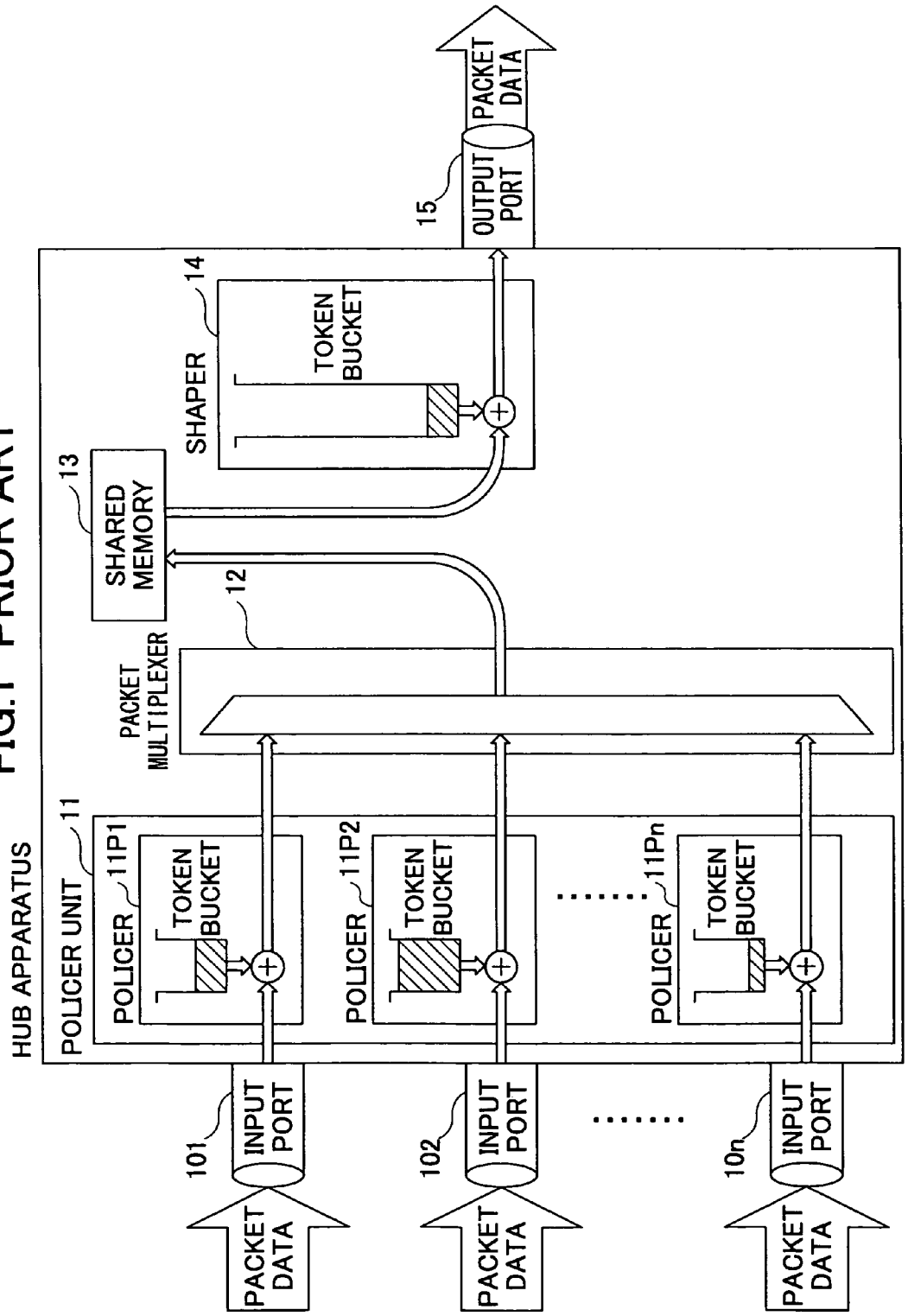
FIG. 1 is a diagram showing an exemplary configuration of a hub apparatus according to the prior art.
Figure 2:
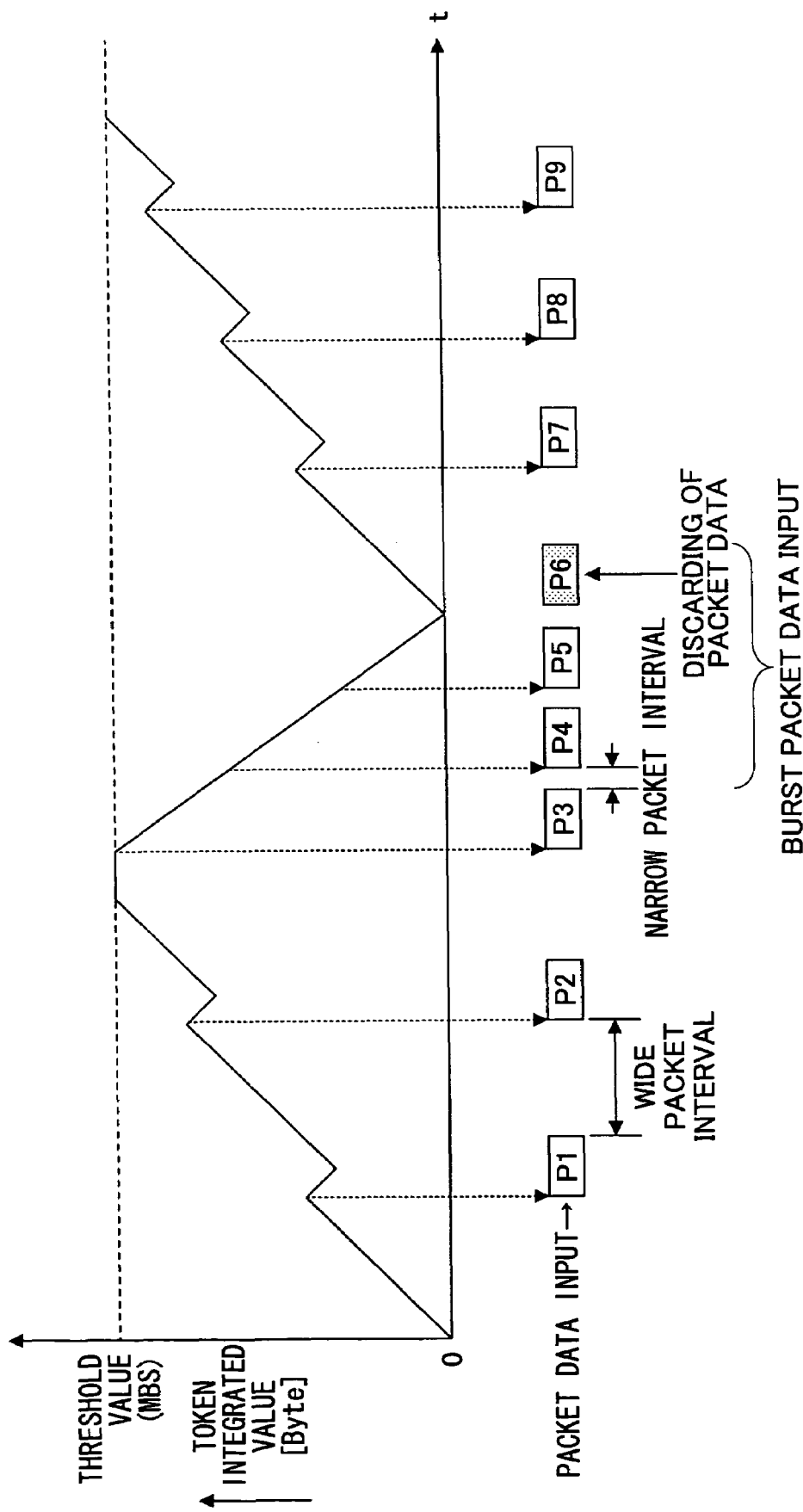
FIG. 2 is a diagram illustrating the increase/decrease of policer tokens and the acquisition of input packet data according to the prior art.
Figure 3:
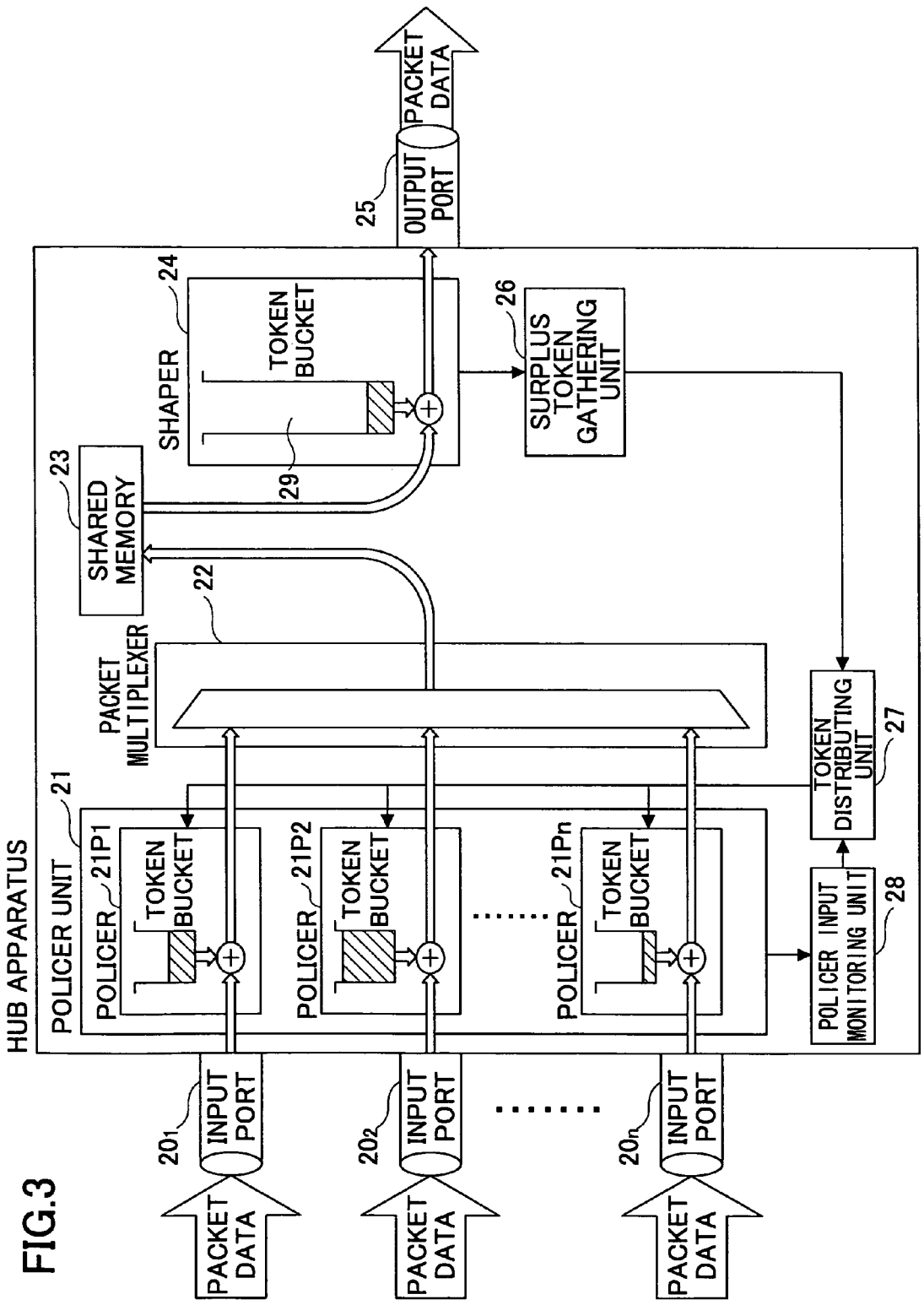
FIG. 3 is a diagram showing a configuration of a hub apparatus according to an embodiment of the present invention.

FIG. 3 is a diagram showing a configuration of a hub apparatus according to an embodiment of the present invention. The illustrated hub apparatus of FIG. 3 includes a policer unit 21, a packet multiplexer 22, a shared memory 23, a shaper 24, a surplus token gathering unit 26, a token distributing unit 27, and a policer input monitoring unit 28.

It is noted that the surplus token gathering unit 26, the token distributing unit 27, and the policer input monitoring unit 28 may make up a surplus token recycling unit according to an embodiment of the present invention.

The illustrated hub apparatus of FIG. 3 accommodates plural input ports $20_1$-$20_n$ that input packet data for the Ethernet or PON (Passive Optical Network), for example.

The policer unit 21 monitors the input bandwidth of the input ports $20_1$-$20_n$ and includes policers 21P1-21Pn having input token buckets that are assigned to the input ports $20_1$-$20_n$, respectively. When packet data are input at short intervals so that tokens exceeding the amount of tokens accumulated in the input buckets of the policers 21P1-21Pn are requried, that is, when burst packet data are input, packet data are discarded to control the traffic of the input packet data.

The packet multiplexer 22 multiplexes packet data acquired by the policer unit 21 according to header information and stores the multiplexed packet data in the shared memory 23.

The shaper 24 includes an output token bucket 29 that accumulate tokens, reads packet data from the shared memory 23 when tokens are accumulated for transmitting the packet data, and transmits the packet data to a network via a single output port 25 at equal packet transmission intervals in order to reduce burst characteristics of the hub apparatus.

According to the token bucket scheme employed by the policer 21 and the shaper 24, tokens are accumulated at a fixed rate, and when a predetermined amount of tokens are accumulated, received packet data are transmitted and a corresponding amount of tokens are consumed from the token bucket.

The surplus token gathering unit 26 monitors the output token bucket 29 of the shaper 24. When the surplus token gathering unit 26 detects surplus tokens exceeding the MBS of the output token bucket 29, it gathers the surplus tokens and informs the token distributing unit 27 of the monitoring results. The policer input monitoring unit 28 monitors the token accumulation of the input token buckets of the policers 21P1-21Pn and informs the token distributing unit 27 of the monitoring results and the established bandwidths (contracted bandwidths) of the input ports $20_1$-$20_n$.

The token distributing unit 27 redistributes the surplus tokens to the policers 21P1-21Pn according to the ratio of bandwidths (contracted bandwidths) assigned to the input ports $20_1$-$20_n$. In this way, tokens accumulated in the policers 21P1-21Pn may be increased.

According to one embodiment, in a case where the amount of accumulated tokens in the policers 21P1-21Pn exceeds the MBS of the token buckets of policers 21P1-21Pn when the surplus tokens are redistributed thereto, an average bandwidth of a predetermined period for a relevant policer may be calculated and the surplus tokens may be assigned to the policers in a manner such that the average bandwidth does not exceed the established bandwidth (contracted bandwidth), and the remaining tokens may be discarded.

<Principle>

Figure 4:
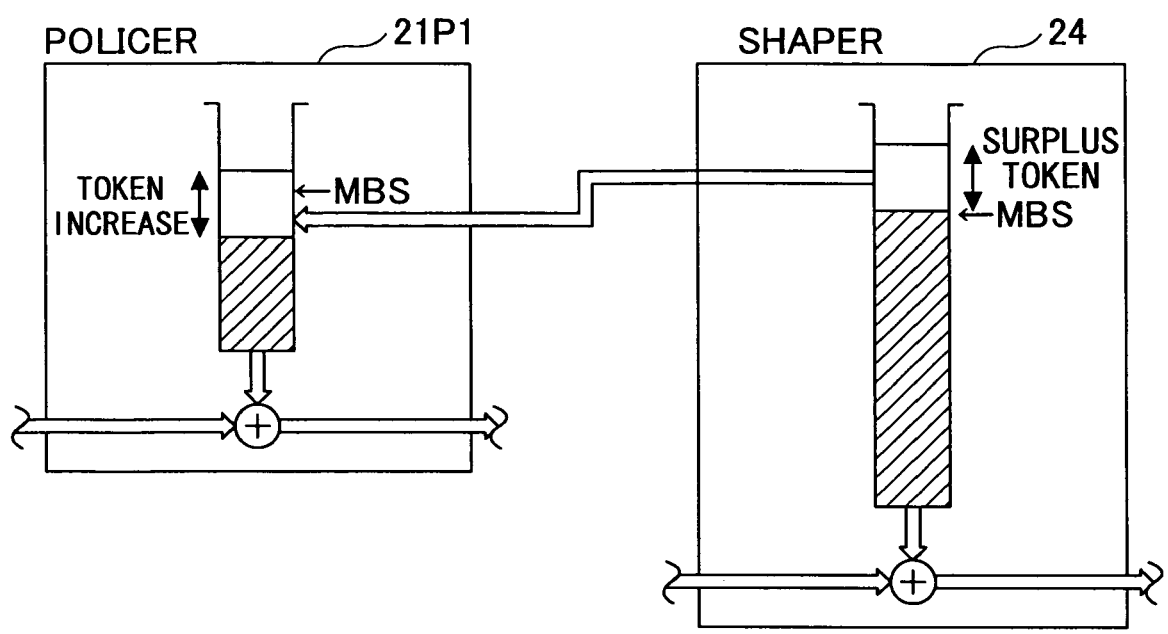
FIG. 4 is a diagram illustrating a principle of an embodiment of the present invention.

FIG. 4 is a diagram illustrating an underlying principle of an embodiment of the present invention. As is shown in this drawing, when the traffic amount of packet data to be transmitted from the shaper 24 is relatively small so that tokens are accumulated in the output token bucket 29 at a faster rate than the rate at which they are consumed for transmitting the transmission packet data, surplus tokens (tokens exceeding the MBS) are generated at the shaper 24. By supplying the generated surplus tokens to the policer 21P1 as recycled tokens, the amount of tokens accumulated in the policer 21P1 may be increased so that discarding of packet data due to momentary occurrence of burst packet data input may be reduced, for example. In this way, packet rate performance may be improved.

In a case where the amount of accumulated tokens at the policer 21P1 exceeds the MBS of the input token bucket of the policer 21P1, an average bandwidth of a predetermined period for the policer 21P1 is calculated and a portion of the surplus tokens are assigned to the policer 21P1 in a manner such that the average bandwidth does not exceed the established bandwidth (contracted bandwidth) for the input port $20_1$ and the remaining tokens are discarded. That is, according to one embodiment, the MBS of the input token bucket may be dynamically changed on a momentary basis.

Figure 5:
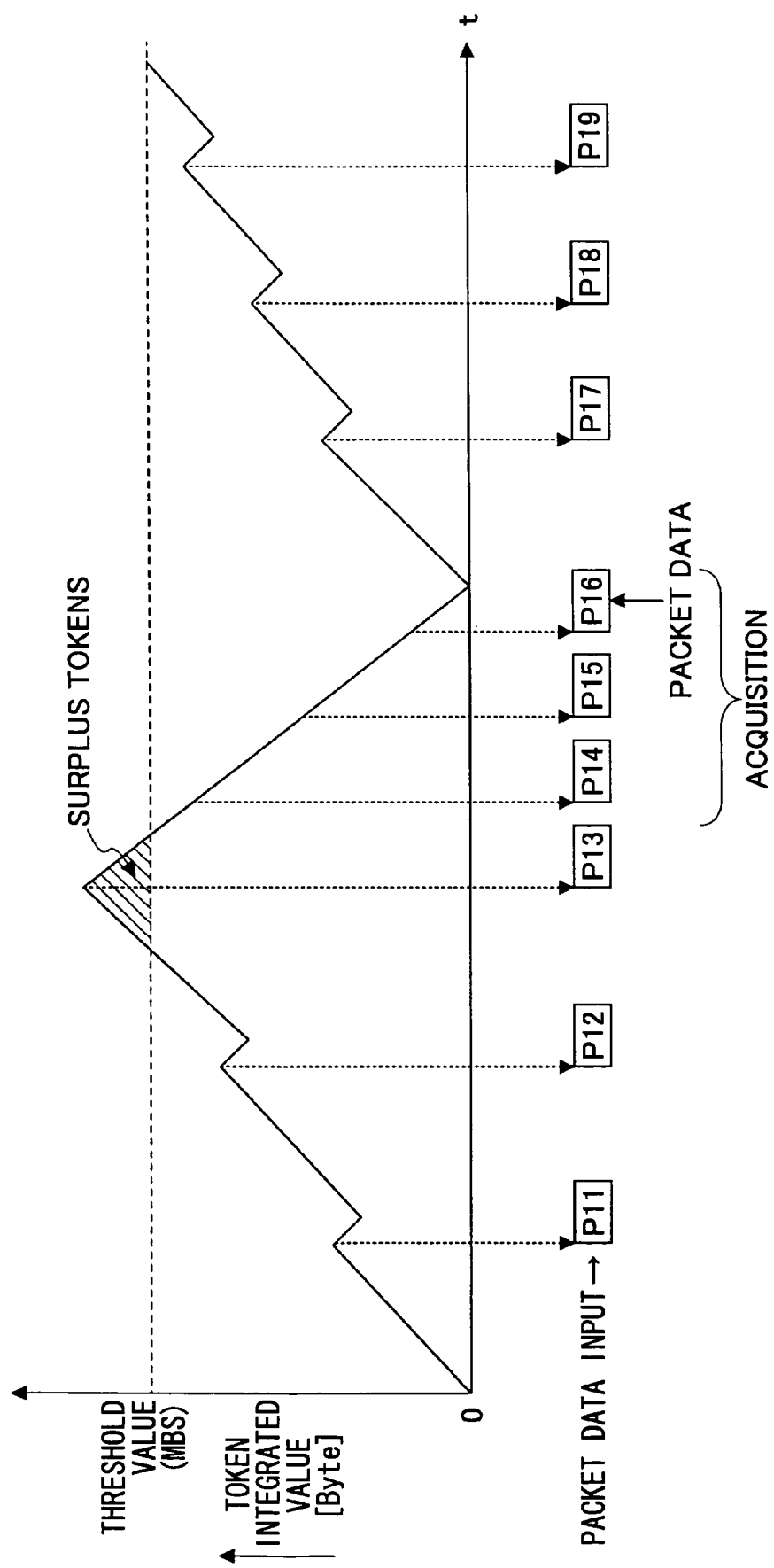
FIG. 5 is a diagram illustrating the increase/decrease of policer tokens and the acquisition of input packet data according to an embodiment of the present invention.

FIG. 5 is a diagram illustrating the increase/decrease of policer tokens and the acquisition of input packet data according to an embodiment of the present invention. As is shown in this drawing, the intervals between input packet data P11-P13 are relatively long so that sufficient time may be secured for accumulating tokens for acquiring the packet data P11-P13.

On the other hand, the intervals between packet data P14-P16 are relatively short (burst packet data) so that sufficient time may not be secured for accumulating tokens. In this case, tokens may be consumed without being adequately replenished so that the tokens are gradually depleted. However, in the present embodiment, surplus tokens of the shaper 24 are redistributed and accumulated in the policer unit 21 (see hatched portion of FIG. 5) so that complete depletion of tokens may be prevented and the packet data P16 may be acquired.

<Surplus Token Distribution>

In the embodiment of FIG. 3, the surplus tokens generated at the shaper 24 are recycled by being redistributed to the policers 21P1-21Pn assigned to the input ports $20_1$-$20_n$ of the policer unit 21 according to the ratio of contracted bandwidths assigned to the input ports $20_1$-$20_n$. In this way, distinctions may be made between contract users using different input ports.

Figure 6:
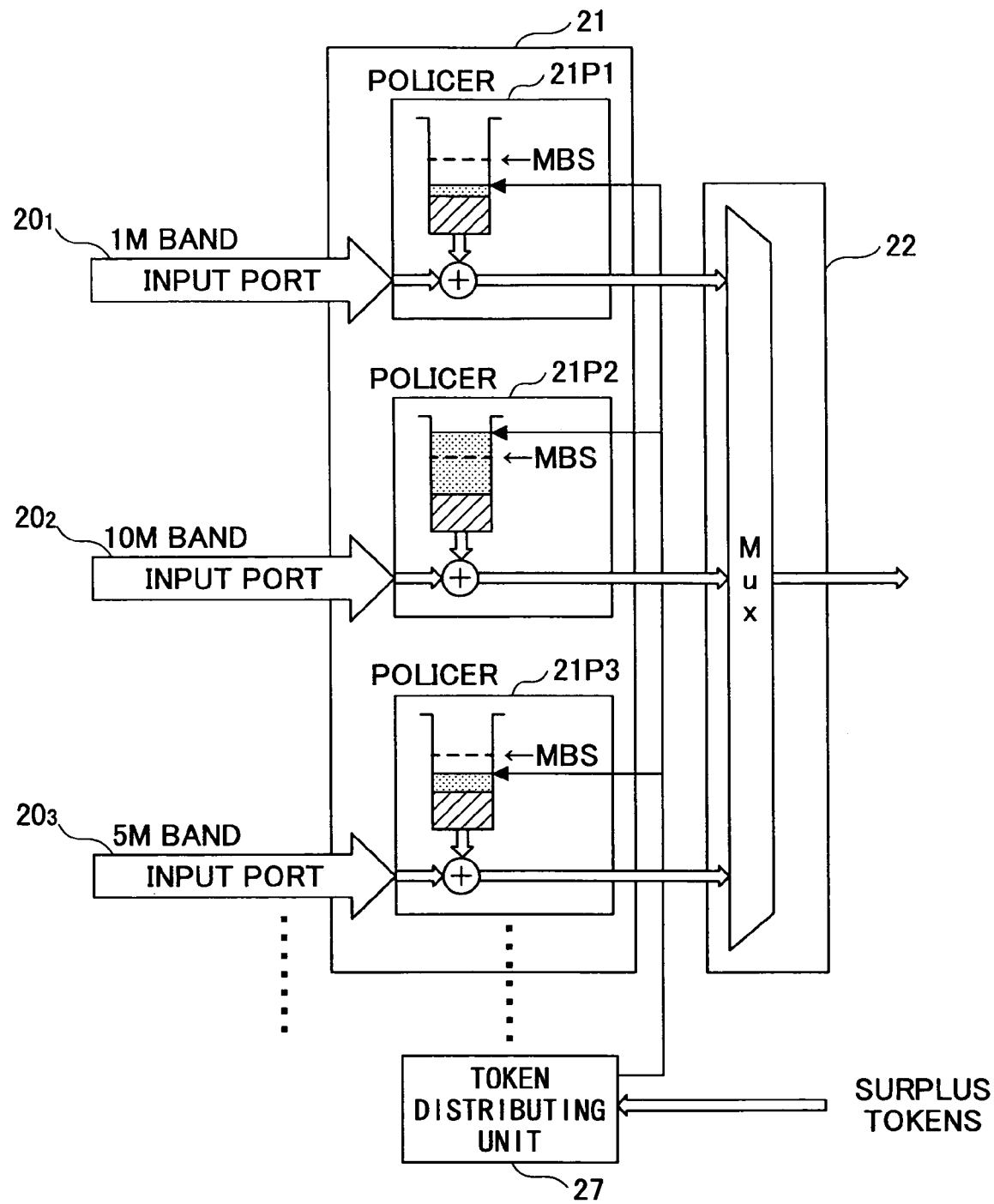
FIG. 6 is a diagram illustrating distribution of surplus tokens to policers within a policer unit.

FIG. 6 is a diagram illustrating the distribution of surplus tokens to the policer unit 21. In this drawing, the token distributing unit 27 determines the bandwidths assigned to the input ports $20_1$-$20_n$ and distributes the surplus tokens generated at the shaper 24 to the policers 21P1-21P3 according to the ratio of bandwidths assigned to the input ports $20_1$-$20_n$.

In the illustrated example of FIG. 6, it is assumed that the established bandwidth for the input port $20_1$ is 1 Mbps, the established bandwidth for the input port $20_2$ is 10 Mbps, and the established bandwidth for the input port $20_3$ is 5 Mbps. Since the distribution ratio for distributing the surplus tokens is determined according to the ratio of bandwidths assigned to the input ports $20_1$-$20_3$, and in the example of FIG. 6, the ratio of bandwidths, port $20_1$:port $20_2$:port $20_3$ is 1:10:5, if one hundred surplus tokens are to be supplied to the policer unit 21, six tokens are assigned to the policer 21P1, sixty tokens are assigned to the policer 21P2, and thirty tokens are assigned to the policer 21P3, for example.

In the case where the amount of tokens accumulated in the policers 21P1-21Pn exceeds the MBS of the input token buckets of the policers 21P1-21Pn when the surplus tokens generated at the shaper 24 are redistributed, an average bandwidth of a predetermined period for a relevant policer is calculated, the surplus tokens are assigned in a manner such that the average bandwidth does not exceed the established bandwidth (contracted bandwidth), and the remaining tokens are discarded.

As can be appreciated, by determining the distribution ratio for distributing the surplus tokens according to the bandwidths (contracted bandwidths) assigned to the input ports, distinctions may be made between contract users using different input ports.

<Surplus Token Distribution based on Class>

Tokens including recycled surplus tokens that are distributed to the policer unit 21 according to the ratio of bandwidths assigned to the input ports $20_1$-$20_n$ may be distributed further within each port according to a distribution ratio of bandwidths assigned to different classes. In this way, distinctions may be made between packet types used by a contract user of a given input port, for example.

Figure 7:
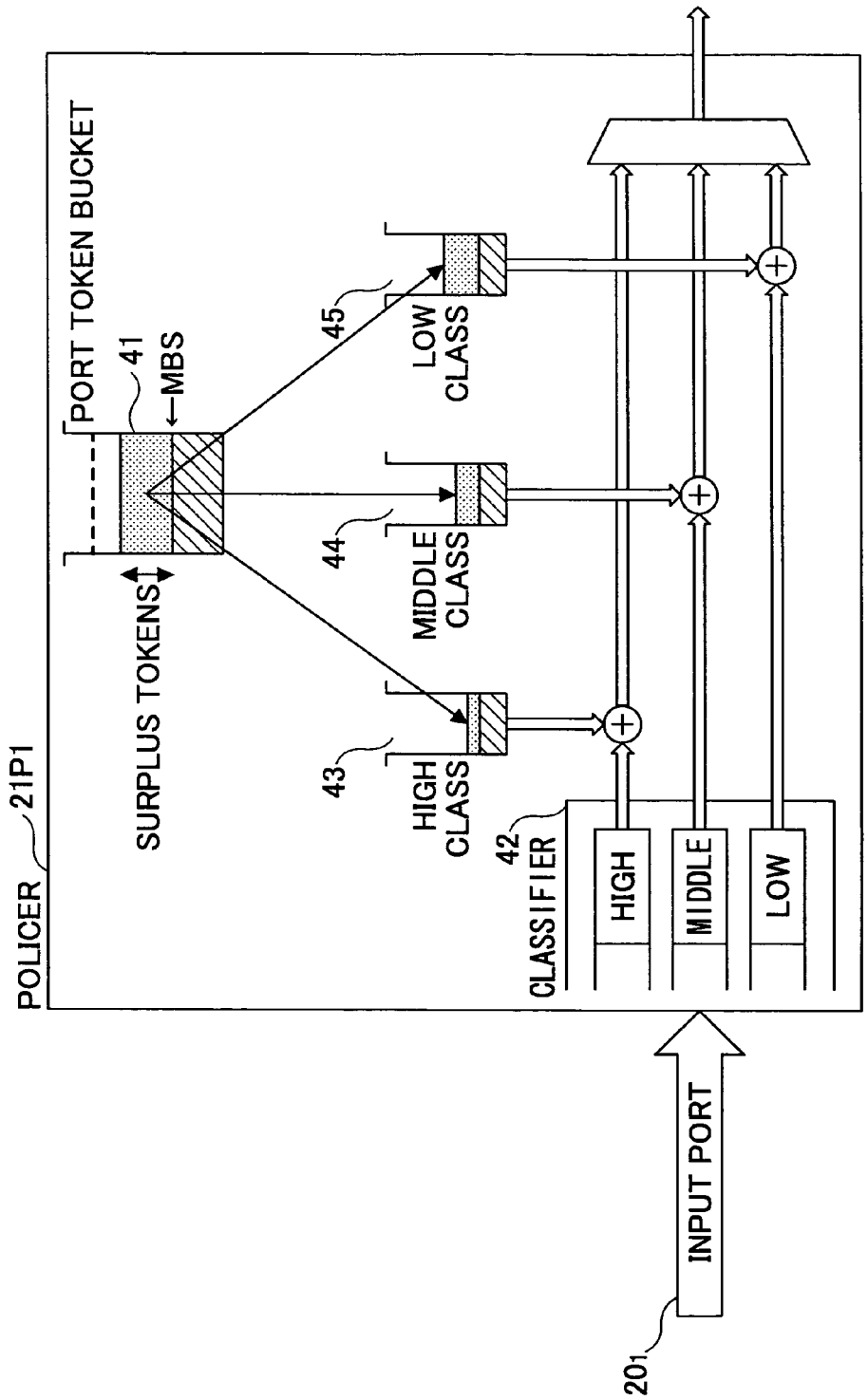
FIG. 7 is a diagram illustrating distribution of policer tokens to different classes within a policer.

FIG. 7 is a diagram showing an exemplary configuration of the policer 21P1. The illustrated policer 21P1 includes a port token bucket 41 that accumulates tokens including surplus tokens and a classifier 42 that monitors a tag included in input packet data and classifies the input packet data.

Figure 8:
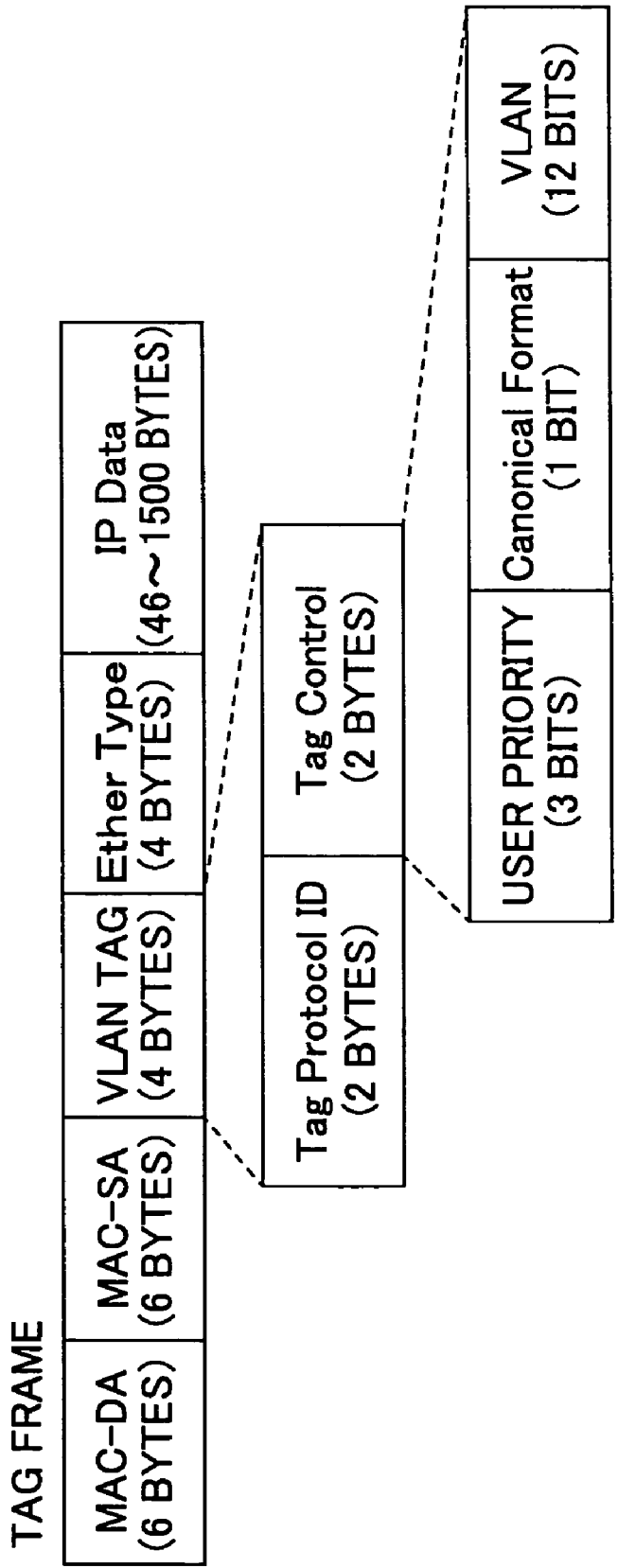
FIG. 8 is a diagram illustrating a data format of input packet data using the VLAN.

FIG. 8 is a diagram illustrating a data format of input packet data for a VLAN (Virtual Local Area Network) As is shown in this drawing, the input packet data includes a destination address MAC-DA, a sender address MAC-SA, a 4-byte VLAN tag, which includes 3-bit user priority information (user priority value). The user priority information indicates whether input packet data correspond to high class (high priority packet), middle class (middle priority packet), or low class (low priority packet).

The classifier 42 classifies the input packet data to high class (high priority packet), middle class (middle priority packet), or low class (low priority packet) based on the user priority information.

In the illustrated example of FIG. 7, a high class token bucket 43, a middle class token bucket 44, and a low class token bucket 45 (collectively referred to as "class token buckets") are provided for the high class, middle class, and the low class, respectively, and the token distribution ratio at which tokens are to be distributed to the class token buckets is determined in advance. Thus, tokens including recycled surplus tokens that are accumulated in the port token bucket 41 are distributed to the class token buckets 43-45 according to the predetermined distribution ratio.

For example, the tokens including recycled surplus tokens that are accumulated in the port token bucket 41 may be distributed to the high class token bucket 43, the middle class token bucket 44, and the low class token bucket 45 at a ratio of 3:2:1. In this way, distinctions may be made between different types of packets being transmitted.

According to an aspect of the present invention, discarding of packets due to momentary occurrence of burst packet data input may be reduced. According to another aspect of the present invention, distinctions may be made between contract users using different input ports, and priority control may be performed within each input port according to different classes so that packet data transmission efficiency may be improved while performing adequate bandwidth control.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing date of Japanese Patent Application No. 2006-023551 filed on Jan. 31, 2006, the entire contents of which are hereby incorporated by reference.

What is claimed is:

1. A hub apparatus comprising:
   a plurality of input ports;
   a policer unit that monitors an input bandwidth of the input ports and controls acquisition and discarding of input packet data input via the input ports, the policer unit including a plurality of policers assigned to the input ports which policers include input token buckets for accumulating input tokens;
   a packet multiplexer that multiplexes the input packet data acquired by the policer unit;
   a shaper that transmits the multiplexed packet data at equal intervals according to an output bandwidth, the shaper including an output token bucket that accumulates output tokens up to a predetermined amount; and a surplus token recycling unit that recycles surplus tokens exceeding the predetermined amount that are generated at the output token bucket of the shaper by distributing the surplus tokens to the input token buckets of the policers of the policer unit.

2. The hub apparatus as claimed in claim 1, wherein the surplus token recycling unit includes a surplus token gathering unit that gathers the surplus tokens exceeding the predetermined amount generated at the output token bucket of the shaper; and a token distributing unit that distributes the surplus tokens to the input token buckets of the policers assigned to the input ports according to a ratio of bandwidths assigned to the input ports.

3. The hub apparatus as claimed in claim 2, wherein at least one policer of the policers assigned to the input ports includes a classifier that classifies the input packet data into at least one of a plurality of different classes; and a plurality of class token buckets that accumulate corresponding class tokens of class tokens assigned to the different classes; wherein the surplus tokens distributed to said at least one policer by the token distributing unit are further distributed to the class token buckets according to a predetermined class distribution ratio.

4. The hub apparatus as claimed in claim 3, wherein the input packet data has a tag including a user priority value; and the classifier classifies the input packet data according to the user priority value included in the input data packet.

* * * * *